United States Patent Office 3,836,579
Patented Sept. 17, 1974

3,836,579
CERTAIN SUBSTITUTED CARBAMOYL THIOFORMYL CHLORIDES
Wendell Gary Phillips, Olivette, and Kenneth Wayne Ratts, Creve Coeur, Mo., assignors to Monsanto Company, St. Louis, Mo.
No Drawing. Filed Aug. 24, 1971, Ser. No. 174,536
Int. Cl. C07c *153/00;* C07d *27/04, 29/36*
U.S. Cl. 260—543 R   5 Claims

ABSTRACT OF THE DISCLOSURE

Substituted carbamoyl thioformyl chlorides are prepared from dichloromethane sulfenyl chlorides by reaction with a tertiary phosphine. The thioformyl chlorides are pesticidally active and particularly useful as pre-emergent herbicides.

---

This invention relates to substituted carbamoyl thioformyl chlorides of the formula

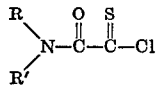

and their manufacture from the corresponding dichloromethane sulfenyl chlorides of the formula

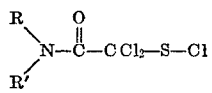

and a tertiary phosphine of the formula

wherein R and R' are hydrogen, lower alkyl, lower alkoxyalkyl, benzyl, phenyl, substituted phenyl wherein the ring substituents thereof total from 1 to 3 same or different substituents selected from the group of substituents consisting of lower alkyl, lower alkoxy, halo, nitro, cyano, and trifluoromethyl, provided that the number of cyano substituents be from 0 to 1, the number of lower alkoxy substituents be from 0 to 2, the number of nitro substituents be from 0 to 2, and the number of trifluoromethyl substituents be from 0 to 2, substituted benzyl wherein the substituents are on the phenyl ring and are as defined for substituted phenyl, or R and R' when taken together are alkylene of the empirical formula $C_nH_{2n}$ wherein $n$ is an integer from 4 through 8, inclusive, and having from 4 through 8 carbons in a continuous chain between the nitrogen terminal valence bonds, and R" is lower alkyl, phenyl or lower alkyl substituted phenyl.

Lower alkyl is alkyl having from 1 to 5 carbons. Examples of lower alkyl include, but are not limited to, methyl, ethyl, propyl, butyl, pentyl and the various isomeric forms thereof.

Lower alkoxy have from 1 to 5 carbons. Examples of alkoxy include, but are not limited to, methoxy, ethoxy, propoxy, butoxy, pentoxy and the various isomeric forms thereof. Lower alkoxyalkyl have from 2 to 8 carbons. Examples of lower alkoxyalkyl include, but are not limited to, propoxymethyl, butoxybutyl, butoxyethyl, methoxymethyl, and ethoxypropyl.

Halo is a halogen selected from the group consisting of fluorine, chlorine, bromine and iodine.

Examples of heterocyclic groups of nitrogen and alkylene of the empirical formula $C_nH_{2n}$ wherein $n$ is an integer from 4 through 8, inclusive, and having from 4 through 8 carbons in a continuous chain between the nitrogen terminal valence bonds include but are not limited to pyrrolidinyl, piperidinyl, hexamethyleneimino, heptamethyleneimino, octamethyleneimino, 2-ethylpyrrolidinyl, 3-butlylpyrrolidinyl, 2,5-dimethylpyrrolidinyl, 2,5-diethylpyrrolidinyl, 3,4-dimethylpyrrolidinyl, 2-pipecolinyl, 3-pipecolinyl, 4-pipecolinyl, 2,6-dimethylpiperidinyl, 2-ethyl-6-methyl-piperidinyl, 2-propylpiperidinyl, 3-methylhexamethyleneimino, 3,4-dimethylhexamethyleneimino, and the various isomeric forms thereof.

The compounds of this invention are conveniently and efficiently prepared by the reaction of about equimolecular proportions of a dichloromethane sulfenyl chloride of the formula

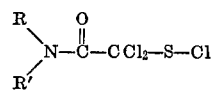

and a tertiary phosphine of the formula

wherein R, R' and R" have the aforementioned significance.

The reaction mass may consist only of the aforedescribed reactants and their reaction products or it may contain other components in addition such as diluents, other inert materials and solvents, i.e., common organic liquids which are inert under the reaction conditions and which may dissolve one or more of the reactants or products of the reaction, which solvents are exemplified by but not limited to aliphatic hydrocarbons, such as pentane, hexane, mineral spirits, etc., aromatics such as benzene, toluene, xylenes, etc., ethers such as diethyl ether, diisopropyl ether, petroleum ether, etc., esters such as methyl acetate, ethyl acetate, propyl acetate, etc., and other organics such as tetrahydrofuran, etc.

The reaction is normally carried out at a temperature above the freezing point of the system but preferably not above its boiling point. Still more preferably, the reaction is carried out at temperatures of from about 0 degrees centigrade (°C.) to about 60° C. The reaction is most conveniently carried out at room temperature, about 23° C., in the presence of a solvent. The reaction is usually carried out at atmospheric pressure, but higher or lower pressures may be utilized if equipment and other factors favor such higher or lower pressures. The reaction may be carried out in an open vessel or under reflux.

Substituted carbamoyl thioformyl chlorides of this invention are useful as biocides. Exemplary of such biocidal uses for these products is the control of nematodes, arachnids, arthropods and insects as well as eradication of noxious weeds. These compounds are particularly useful as pre-emergent and contact herbicides.

Pre-emergent and contact herbicidal compounds are useful in the selective killing of weeds in crops. In using the compounds of the present invention as pre-emergent and contact herbicides, the compounds can be used alone or in combination with a material referred to in the art as an adjuvant in liquid or solid form. Herbicidal formulations are prepared by admixing the compound which is the active ingredient of the formulation with an adjuvant including diluents, extenders, carriers and conditioning agents to provide compositions in the form of finely-divided particulate solids, granules, pellets, solutions, dispersions or emulsions. Thus, the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of the active ingredient. Application of these formulations to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid herbicidal formulations to the surface of soil or to above ground portions of plants can be carried out by conventional methods, e.g., power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the active ingredients.

The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment, the active ingredients are applied in amounts from about 1 to about 50 or more pounds per acre. In applications to soil for the control of the growth of germinant seeds, germinative seeds, emerging seedlings and established vegetation, the active ingredients are applied in amounts from about 0.1 to about 25 or more pounds per acre. It is believed that one skilled in the art can readily determine from the teachings of this specification the general procedure for any application.

Manufacture of dichloromethane sulfenyl chlorides, used as starting materials in the preparation of the compounds of the present invention, is taught in prior U.S. Patent Application Ser. No. 139,976, filed May 3, 1971, entitled "Substituted Alpha,Alpha-Dichloro-Methane Sulfenyl Chlorides and Their Manufacture," now U.S. Pat. 3,770,824.

Tertiary phosphines used in the preparation of the compounds of the present invention are either known compounds or may be prepared by prior art methods from known compounds.

As illustrative of this invention, but not limitative thereof, is the following:

EXAMPLE 1

To a suitable reaction vessel equipped with an agitator is charged approximately 100 milliliters (ml.) of benzene. Approximately 6.2 grams (g.), about 0.02 moles, of dichloro(phenylisopropylcarbamoyl)methane sulfenyl chloride and approximately 5.2 g., about 0.02 moles, of triphenylphosphine are dissolved in the benzene. The mass is stirred overnight. Thereafter the benzene is removed by distillation leaving a red oily residue. The oil is dissolved in diethyl ether and, upon cooling in Dry Ice to −70° C. and scratching the interior surface of the vessel below the liquid surface, a white solid crystallizes out of the solution. The white solid is separated from the liquid by filtration, and appears to be triphenyl phosphine. The ether is then removed from the remaining oil by distillation. A red oil remains. Petroleum ether is added to the remaining oil, the mass is cooled in Dry Ice to −70° C., and crystallization is initiated by scratching the interior surface of the vessel below the liquid surface. Red crystals are separated from the petroleum ether by filtration. The red solid is found to have a melting point of about 35 to 37° C. and is identified by mass spectrometer as phenylisopropylcarbamoyl thioformyl chloride

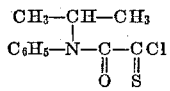

Calculated for $C_{11}H_{12}ClNOS$: C, 54.65; H, 5.00; N, 5.79. Found: C, 54.60; H, 5.12; N, 5.46.

EXAMPLE 2

To a suitable reaction vessel equipped with an agitator is charged about 100 ml. of benzene. Approximately 5.6 g., about 0.02 moles, of dichloro(diisopropylcarbamoyl) methyl sulfenyl chloride and approximately 5.2 g., about 0.02 moles, of triphenylphosphine is added and dissolved in the benzene. The mass is stirred for about 1 hour at ambient room temperature, about 23° C., and the solvent is removed by distillation leaving a residual oil. To the oil is added diethyl ether. Two phases form. The upper orange solution phase is decanted off the oily residue. This solution is cooled to −70° C. in Dry Ice and filtered. Solvent is removed from the filtered solution by distillation. The remaining oil is dissolved in petroleum ether. The solution is cooled to −70° C. and the precipitate which forms is separated from the petroleum ether by filtration. Upon recrystallization in this same manner, the orange solid is found to have a melting point of about 60 to 63° C. and is identified by nuclear magnetic resonance as di-isopropylcarbamoyl thioformyl chloride

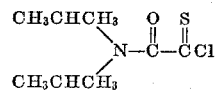

Calculated for $C_{18}H_{14}ClNOS$: C, 46.26; H, 6.79. Found: C, 46.02; H, 6.73.

EXAMPLE 3

To a suitable reaction vessel equipped with an agitator is charged approximately 100 ml. of benzene. Approximately 13.5 g., about 0.061 moles, of dichloro(dimethylcarbamoyl)methane sulfenyl chloride and approximately 16 g., about 0.061 moles, of triphenyl phosphine are dissolved in the benzene. The reaction mass is stirred for about 1 hour. Solvent is removed by distillation leaving a residual oil. The portion of the residual oil which is found to have a boiling point of about 115 to 119° C. is identified as dimethylcarbamoyl thioformyl chloride

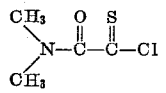

Calculated for $C_4H_6ClNOS$: C, 31.69; H, 3.99. Found: C, 32.11; H, 4.04.

EXAMPLES 4 THROUGH 25

The procedure of Example 2 is followed except that, in place of about 5.6 g. of dichloro (diisopropylcarbamoyl)methane sulfenyl chloride, an approximately equimolecular amount of the compound of Column A is charged and the product of Column B is obtained:

| Ex. | A | B |
|---|---|---|
| 4 | 2,6-(CH₃)₂C₆H₃-N(CH₂OCH₃)-C(O)-CCl₂-S-Cl | 2,6-(CH₃)₂C₆H₃-N(CH₂OCH₃)-C(O)-C(S)Cl |
| 5 | 3-CH₃-C₆H₄-N(C₂H₅)-C(O)-CCl₂-S-Cl | 3-CH₃-C₆H₄-N(C₂H₅)-C(O)-C(S)Cl |
| 6 | 4-C₂H₅-C₆H₄-N((CH₂)₄CH₃)-C(O)-CCl₂-S-Cl | 4-C₂H₅-C₆H₄-N((CH₂)₄CH₃)-C(O)-C(S)Cl |
| 7 | 2,6-(CH₃CH(CH₃))₂C₆H₃-N(CH₂CH(CH₃)₂)-C(O)-CCl₂-S-Cl | 2,6-(CH₃CH(CH₃))₂C₆H₃-N(CH₂CH(CH₃)₂)-C(O)-C(S)Cl |
| 8 | C₆H₅-N(C₆H₅)-C(O)-CCl₂-S-Cl | C₆H₅-N(C₆H₅)-C(O)-C(S)Cl |
| 9 | (CH₃)₃C-N(CH₂-C₆H₄-CH₃)-C(O)-CCl₂-S-Cl | (CH₃)₃C-N(CH₂-C₆H₄-CH₃)-C(O)-C(S)Cl |
| 10 | C₆H₅CH₂-N(C₆H₅)-C(O)-CCl₂-S-Cl | C₆H₅CH₂-N(C₆H₅)-C(O)-C(S)Cl |
| 11 | CH₃(CH₂)₃-N(CH₃(CH₂)₃)-C(O)-CCl₂-S-Cl | CH₃(CH₂)₃-N(CH₃(CH₂)₃)-C(O)-C(S)Cl |
| 12 | (CH₂)₄N-C(O)-CCl₂-S-Cl | (CH₂)₄N-C(O)-C(S)Cl |
| 13 | (CH₂)₈N-C(O)-CCl₂-S-Cl | (CH₂)₈N-C(O)-C(S)Cl |
| 14 | [CH₂-CH(CH₃)-N-CH₂-CH(CH₃)]-C(O)-CCl₂-S-Cl | [CH₂-CH(CH₃)-N-CH₂-CH(CH₃)]-C(O)-C(S)Cl |
| 15 | CH₃(C₆H₅CH₂)N-C(O)-CCl₂-S-Cl | CH₃(C₆H₅CH₂)N-C(O)-C(S)Cl |
| 16 | CH₃-N(C₆H₄-CH₂CH(CH₃)₂)-C(O)-CCl₂-S-Cl | CH₃-N(C₆H₄-CH₂CH(CH₃)₂)-C(O)-C(S)Cl |
| 17 | 2,6-Cl₂-C₆H₃-N(CH₃)-C(O)-CCl₂-S-Cl | 2,6-Cl₂-C₆H₃-N(CH₃)-C(O)-C(S)Cl |

| Ex. | A | B |
|---|---|---|

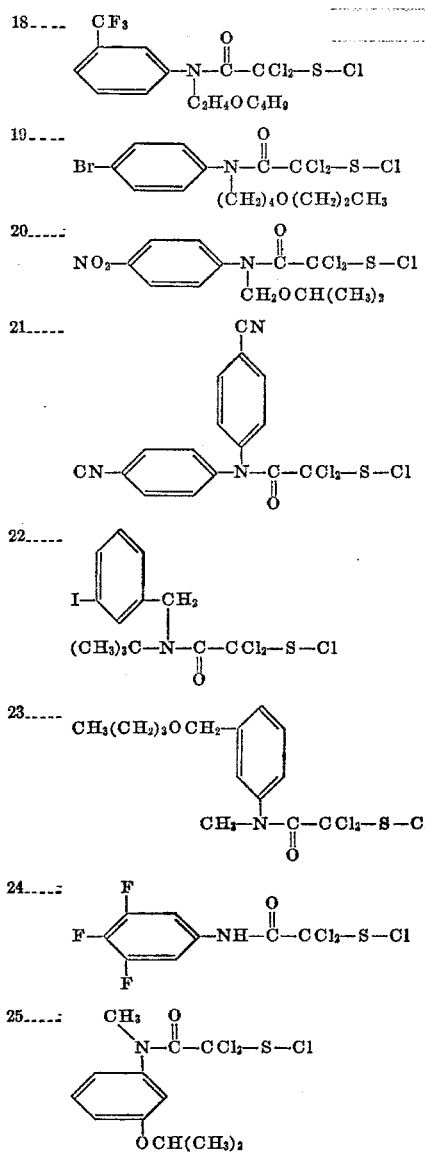
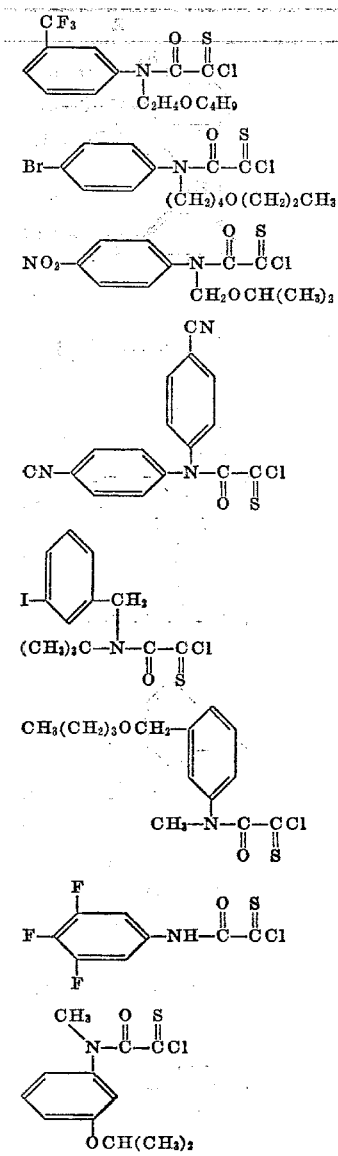

EXAMPLES 26 AND 27

The procedure of Example 1 is followed in each of the examples except that, in place of about 5.2 g. of triphenylphosphine, an approximately equimolecular amount of the specified tertiary phosphine is charged. The product of Example 1 is obtained.

Example 26—Tri-o-tolylphosphine.
Example 27—Tributylphosphine.

EXAMPLE 28

Contact herbicidal activity of representative substituted carbamoyl thioformyl chlorides of this invention is determined by the following procedure:

The compound to be tested is applied in spray form to plants of a given age of several grasses and broadleaf species. After the plants are the desired age, each aluminum pan is sprayed with a given volumn of a 0.2% concentration solution of the candidate chemical, corresponding to a rate of approximately 4 lbs. per acre. This solution is prepared from an aliquot of a 2% solution of the candidate compound in acetone, a known amount of cyclohexanone-emulsifying agent mix, and sufficient water to make up to volume. The emulsifying agent is a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants are then observed approximately 14 days later and the results are recorded.

Contact herbicidal activity of the compound prepared in Example 1 is observed against lambsquarter and smartweed.

EXAMPLE 29

Pre-emergent herbicidal activity of representative substituted carbamoyl thioformyl chlorides of this invention is determined by the following procedure:

A good grade of top soil is placed in aluminum pans and compacted to a depth of ⅜ to ½ inch from the top of the pan. A pre-determined number of seeds of each of several plant species are placed on top of the soil in the pans. The seeds are covered with soil and the pans leveled. The herbicidal composition is applied by spraying the surface of the top layer of soil with a solution containing a sufficient amount of active ingredient to obtain a rate of application of 5 lbs. per acre. The pans are then placed on a sand bench in the greenhouse and watered from below as needed. The plants are observed at the end of approximately 14 days and the results recorded.

Pre-emergent activity of the compound prepared in Example 1 is observed against velvet leaf, morning glory, smartweed, quack grass, Johnson grass and barnyard grass.

EXAMPLE 30

For the purpose of determining biocidal activity of representative substituted carbamoyl thioformyl chlorides of this invention with respect to larvae of the western corn rootworm, *Diabrotica virgifera,* a soil insect causing substantial economic losses every year, the following test procedure is run:

A 1 ml. portion of an acetone/distilled water solution containing a known quantity in p.p.m. of the test compound is pipetted into a petri dish (100 x 15 mm.) having a sheet of filter paper (9 cm. diameter) placed in the center thereof. Two sections of corn roots (each 1 inch in length) are then placed in the dish, followed by infestation of the dish contents with newly hatched western corn rootworm larvae from diapaused eggs (5 larvae are placed in each dish). The petri dish is placed in a container to preserve moisture and thereafter inserted in a constant temperature-humidity box maintained at 25° C. and 70% relative humidity. After 24 hours mortalities are observed using a microscope for accurate reading.

A 40% mortality is observed at a concentration of 10 p.p.m. when the compound of Example 2 is employed as the test compound.

While the illustrative embodiments of the invention have been described hereinbefore with particularity, it will be understood that various other modifications will be apparent to and can readily be made by those skilled in the art without departing from the scope and spirit of the invention.

What is claimed is:

1. A compound of the formula

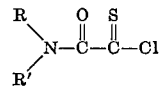

wherein R and R' are each lower alkyl.

2. The compound of Claim 1 wherein R and R' are each methyl.

3. The compound of Claim 1 wherein R and R' are each isopropyl.

4. A compound of the formula

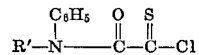

wherein R' is lower alkyl.

5. The compound of Claim 4 wherein R' is isopropyl.

References Cited

Lozins'kii et al., Chemical Abstracts, vol. 69, Abstract No. 59144c (1968).

Kumelj et al., Chemical Abstracts, vol. 54, col. 22426e (1960).

ALTON D. ROLLINS, Primary Examiner

U.S. Cl. X.R.

71—88, 94, 95, 100; 260—239 BF, 293.85, 326.5 S, 465 D, 561 S, 562 S; 424—244, 267, 274, 315